United States Patent
Yu

(10) Patent No.: US 8,077,254 B2
(45) Date of Patent: Dec. 13, 2011

(54) PORTABLE CAMERA HAVING LENS ASSEMBLY SWITCHING MECHANISM

(75) Inventor: Chien-Nan Yu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 445 days.

(21) Appl. No.: 12/348,432

(22) Filed: Jan. 5, 2009

(65) Prior Publication Data
US 2010/0123819 A1    May 20, 2010

(30) Foreign Application Priority Data

Nov. 14, 2008    (TW) ................................ 97220420 U

(51) Int. Cl.
*G03B 17/00* (2006.01)
(52) U.S. Cl. ........................................................ 348/360
(58) Field of Classification Search .................. 348/360, 348/373–375, 419, 427, 428; 396/73–75, 396/419, 427, 428; 455/556.1; 359/672, 359/673, 813; 352/142
See application file for complete search history.

(56) References Cited

U.S. PATENT DOCUMENTS

| | | | | |
|---|---|---|---|---|
| 2,482,571 A * | 9/1949 | Arnold | ............................... | 396/74 |
| 2,575,536 A * | 11/1951 | Thompson | ...................... | 396/74 |
| 2,720,145 A * | 10/1955 | Goodfellow | .................... | 396/74 |
| 3,185,061 A * | 5/1965 | Westphalen | ..................... | 396/74 |
| 3,573,367 A * | 4/1971 | LaRue, Jr. | ........................ | 348/357 |
| 4,264,175 A * | 4/1981 | Hayata et al. | ................... | 396/73 |
| 5,448,323 A * | 9/1995 | Clark et al. | .................... | 396/107 |
| 6,339,680 B1 * | 1/2002 | Mauvais | ............................ | 396/6 |
| 6,501,909 B1 * | 12/2002 | Nishimura et al. | ............. | 396/74 |
| 6,643,457 B2 * | 11/2003 | Chen | ................................ | 396/74 |
| 6,679,463 B1 * | 1/2004 | Chen | ................................ | 248/126 |
| 7,443,615 B2 * | 10/2008 | Chang | ............................ | 359/811 |
| 7,747,155 B1 * | 6/2010 | Gutierrez | ......................... | 396/73 |
| 7,755,697 B2 * | 7/2010 | Hsu | ................................. | 348/347 |
| 7,835,091 B2 * | 11/2010 | Tseng et al. | .................... | 359/811 |
| 2005/0101348 A1 * | 5/2005 | Wang | ............................ | 455/556.1 |
| 2006/0170817 A1 * | 8/2006 | Wu | ................................. | 348/373 |
| 2009/0104935 A1 * | 4/2009 | Guo | ............................. | 455/556.1 |

* cited by examiner

*Primary Examiner* — William B Perkey
(74) *Attorney, Agent, or Firm* — Kirton & McConkie; Evan R. Witt

(57) ABSTRACT

A portable camera having a lens assembly switching mechanism is provided. The portable camera includes a camera main body, a camera module, a slab module and a coupling structure. The camera main body has a camera opening formed in a first surface thereof. The camera module is disposed within the camera main body and includes a lens assembly exposed through the camera opening. The slab module is used for carrying one or more selective lens assemblies with different shooting angles. The coupling structure is disposed between the first surface of camera main body and the camera module. The slab module is movable with respect to the coupling structure while the slab module is parallel with the first surface of the camera main body, so that one of the selective lens assemblies is aligned with the camera opening for providing an adjustable shooting angle.

18 Claims, 4 Drawing Sheets

PORTABLE CAMERA HAVING LENS ASSEMBLY SWITCHING MECHANISM

FIELD OF THE INVENTION

The present invention relates to a portable camera, and more particularly to a portable camera having a lens assembly switching mechanism.

BACKGROUND OF THE INVENTION

Recently, the applications of web cameras (PC Cams) to capture images of objects have experienced great growth and are rapidly gaining in popularity. For achieving excellent performance when a web camera is used to shoot an object, the user may select a suitable lens assembly from a set of lens assemblies with different shooting angles according to the practical situations.

For example, in most occasions, the lens assembly with an ordinary shooting angle is acceptable. Whereas, in a case that the web camera is used in a video conference, a lens assembly with a wider shooting angle is desired because the many participants need to be shot by the web camera.

Therefore, there is a need of providing a portable camera having a lens assembly switching mechanism so as to obviate the drawbacks encountered from the prior art.

SUMMARY OF THE INVENTION

The present invention provides a portable camera having a lens assembly switching mechanism so as to select a lens assembly having a desired shooting angle.

In accordance with an aspect of the present invention, there is provided a portable camera having a lens assembly switching mechanism. The portable camera includes a camera main body, a camera module, a slab module and a coupling structure. The camera main body has a camera opening formed in a first surface thereof. The camera module is disposed within the camera main body and includes a lens assembly exposed through the camera opening. The slab module is used for carrying one or more selective lens assemblies with different shooting angles. The coupling structure is disposed adjacent the first surface of the camera main body and the camera module. The slab module is movable with respect to the coupling structure while the slab module is parallel with the first surface of the camera main body, so that one of the selective lens assemblies is aligned with the camera opening for providing an adjustable shooting angle.

In an embodiment, the first surface of the camera main body is an upright surface at a front side of the camera main body. The coupling structure includes an elongated slit formed in a second surface of the camera main body.

In an embodiment, the second surface of the camera main body is a top surface of the camera main body that is adjacent to the upright surface. A bulge edge is horizontally extended from the top surface. The elongated slit is disposed in the bulge edge.

In an embodiment, the slab module includes a T-shaped hook having a vertical slice and a horizontal slice. The horizontal slice is connected to a top surface of the vertical slice and movably supported on the top surface of the bulge edge. The vertical slice of the T-shaped hook is received in the elongated slit.

In an embodiment, the slab module further includes a transverse bracket two hollow receiving parts. The transverse bracket has a middle portion connected to a bottom surface of the vertical slice of the T-shaped hook. The two hollow receiving parts are respectively connected to bottom surfaces of two lateral portions of the transverse bracket such that two selective lens assemblies are respectively embedded within the two hollow receiving parts. The T-shaped hook, the transverse bracket and the two hollow receiving parts are integrally formed as the slab module.

In an embodiment, the slab module further includes a single hollow receiving part connected to a bottom surface of the vertical slice of the T-shaped hook such that a selective lens assembly is embedded within the single hollow receiving part. The T-shaped hook and the single hollow receiving part are integrally formed as the slab module.

In an embodiment, the coupling structure further comprises a post, which is disposed on the upright surface and in the vicinity of the camera opening.

In an embodiment, the slab module is a circular slab having a pivotal hole sheathed around the post. An upper periphery of the circular slab is partially penetrated through the elongated slit, so that the upper periphery of the circular slab is rotatable by a user.

In an embodiment, the circular slab further includes one or more hollow receiving parts, and the one or more selective lens assemblies are embedded within the hollow receiving parts.

Preferably, the portable camera is a web camera. The web camera further includes a base and an extendable mechanism. The base is disposed under the camera main body. The extendable mechanism is pivotally coupled to the base.

In accordance with another aspect of the present invention, there is provided a portable camera. The portable camera includes a camera main body, a camera module and a lens assembly switching mechanism. The camera main body has a camera opening formed in a first surface thereof. The camera module is disposed within the camera main body and includes a lens assembly exposed through the camera opening. The lens assembly switching mechanism is disposed in front of the first side of the camera main body, and includes at least two selective lens assemblies with different shooting angles. The slab module is movably coupled to the camera main body while the slab module is parallel with the first surface of the camera main body, so that one of the selective lens assemblies is aligned with the camera opening for providing an adjustable shooting angle.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

It is to be noted that the following descriptions of preferred embodiments of this invention are presented herein for purpose of illustration and description only. It is not intended to be exhaustive or to be limited to the precise form disclosed.

Figure 1A:
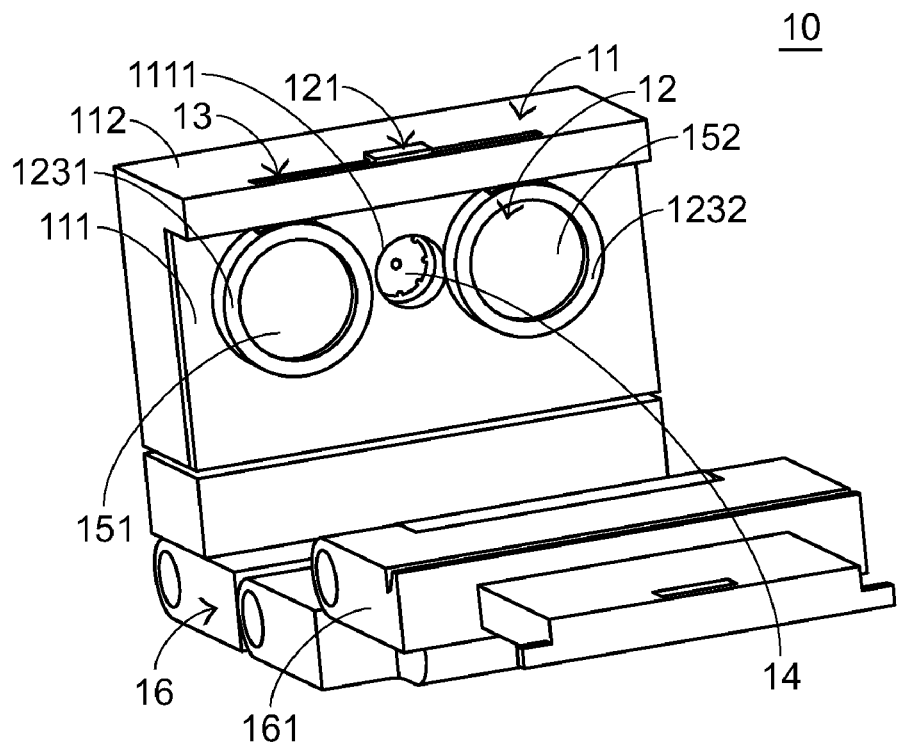
FIG. 1A is a schematic perspective view illustrating a portable camera having a lens assembly switching unit according to a first preferred embodiment of the present invention.
Figure 1B:
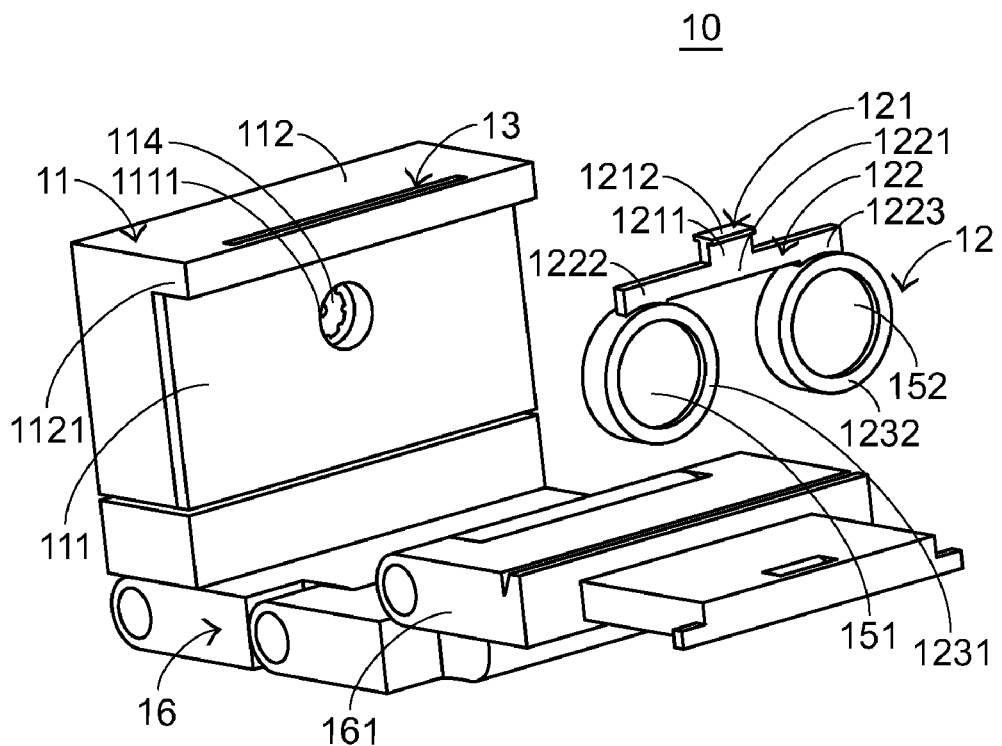
FIG. 1B is a schematic exploded view of the portable camera shown in FIG. 1A.

FIG. 1A is a schematic perspective view illustrating a portable camera having a lens assembly switching unit according to a first preferred embodiment of the present invention. FIG. 1B is a schematic exploded view of the portable camera shown in FIG. 1A. An example of the portable camera 10 includes but is not limited to a web camera. The portable camera 10 principally comprises a camera main body 11, a camera module including a lens assembly 14, a slab module 12 and a coupling structure 13. Except that the lens assembly 14 is exposed to a camera opening 1111 of the camera main body 11, most components of the camera module are disposed within the camera main body 11. The slab module 12 and a coupling structure 13 are collectively defined as a lens assembly switching mechanism.

The camera main body 11 has an upright surface 111 and a top surface 112. The top surface 112 is disposed adjacent and perpendicular to the upright surface 111. The camera opening 1111 is formed in the upright surface 111 for exposing the lens assembly 14 of the portable camera 10. In addition, a bulge edge 1121 is horizontally extended from the top surface 112 such that the bulge edge 1121 is perpendicular to the upright surface 111. In this embodiment, the coupling structure 13 includes an elongated slit that is disposed in the bulge edge 1121.

The slab module 12 comprises a T-shaped hook 121, a transverse bracket 122 and two hollow receiving parts 1231 and 1232. The T-shaped hook 121 includes a vertical slice 1211 and a horizontal slice 1212. The horizontal slice 1212 is connected to the vertical slice 1211 and mounted on the top surface of the vertical slice 1211. The horizontal slice 1212 of the T-shaped hook 121 is movably supported on the top surface of the bulge edge 1121. The vertical slice 1211 of the T-shaped hook 121 is received in the elongated slit 13.

The transverse bracket 122 has a middle portion 1221 and two lateral portions 1231 and 1232. The bottom surface of the vertical slice 1211 of the T-shaped hook 121 is connected to a middle portion 1221 of the transverse bracket 122. The bottom surfaces of two lateral portions 1231 and 1232 of the transverse bracket 122 are connected to the hollow receiving parts 1231 and 1232, respectively. Two lens assemblies 151 and 152 are respectively embedded within the hollow receiving parts 1231 and 1232. The shooting angles of the lens assemblies 151, 152 and 14 are distinguishable. It is preferred that the T-shaped hook 121, the transverse bracket 122 and the hollow receiving parts 1231 and 1232 are integrally formed.

Figure 2A:
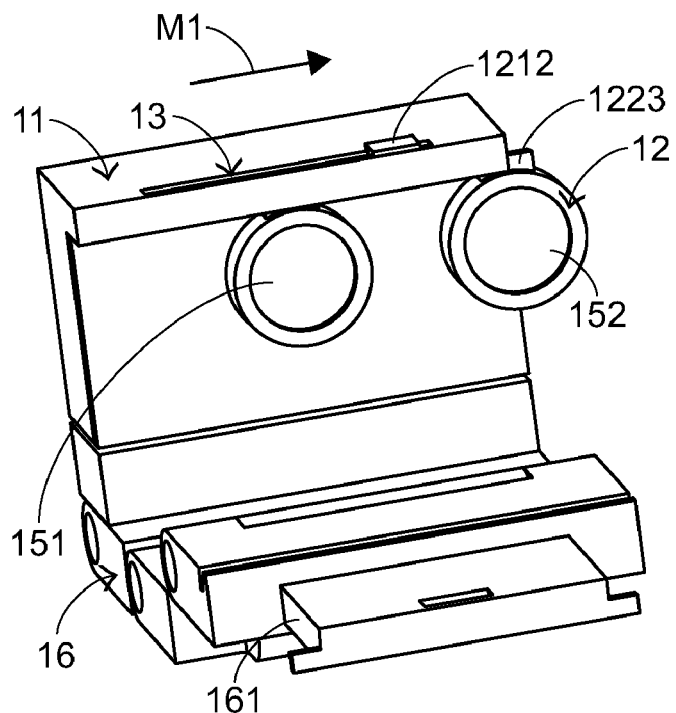
FIGS. 2A and 2B are schematic perspective views illustrating operations of the lens assembly switching mechanism of the portable camera shown in FIG. 1.
Figure 2B:
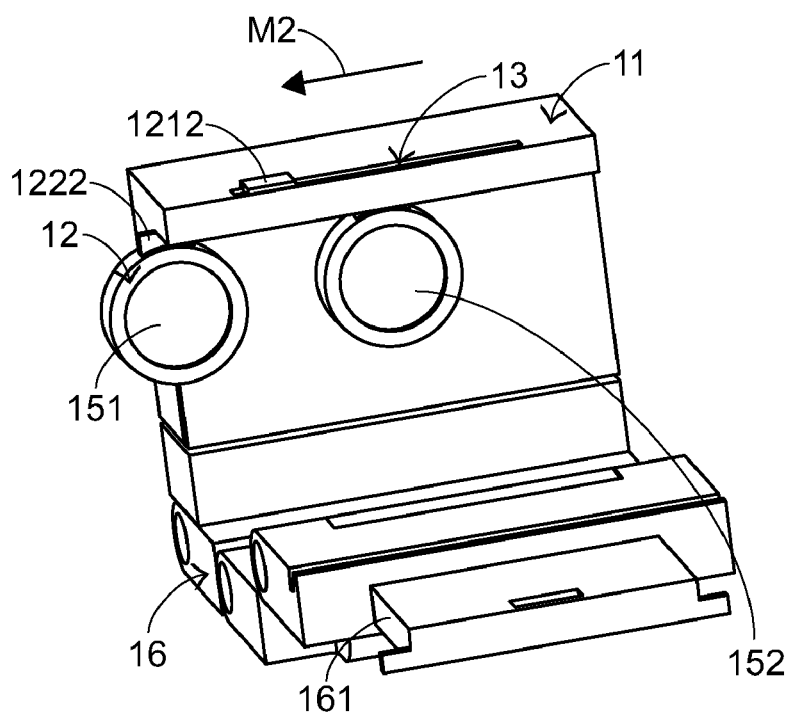

After the T-shaped hook 121 is coupled with the elongated slit 13, the T-shaped hook 121 is movable with respect to the elongated slit 13 in order to choose a desired lens assembly. FIGS. 2A and 2B are schematic perspective views illustrating operations of the lens assembly switching mechanism of the portable camera shown in FIG. 1. When the T-shaped hook 121 is moved in the direction parallel with the upright surface 111 of the camera main body 11, i.e. in a right-side direction M1 or a left-side direction M2, the slab module 12 is synchronously moved. Until the lens assembly 151 or 152 that is mounted on the slab module 12 is aligned with the camera opening 1111, the lens assembly 151 or 152 is selected to provide a desired shooting range.

Moreover, the portable camera 10 further comprises a base 16 and an extendable mechanism 161. The base 16 is disposed under the camera main body 11. The extendable mechanism 161 is pivotally coupled to the base 16. The extendable mechanism 161 comprises two or more first extension plates, which are selectively folded or unfolded with respect to the base 16 such that the focal length between the selected lens assembly and the object (not shown) is adjustable.

Figure 3:
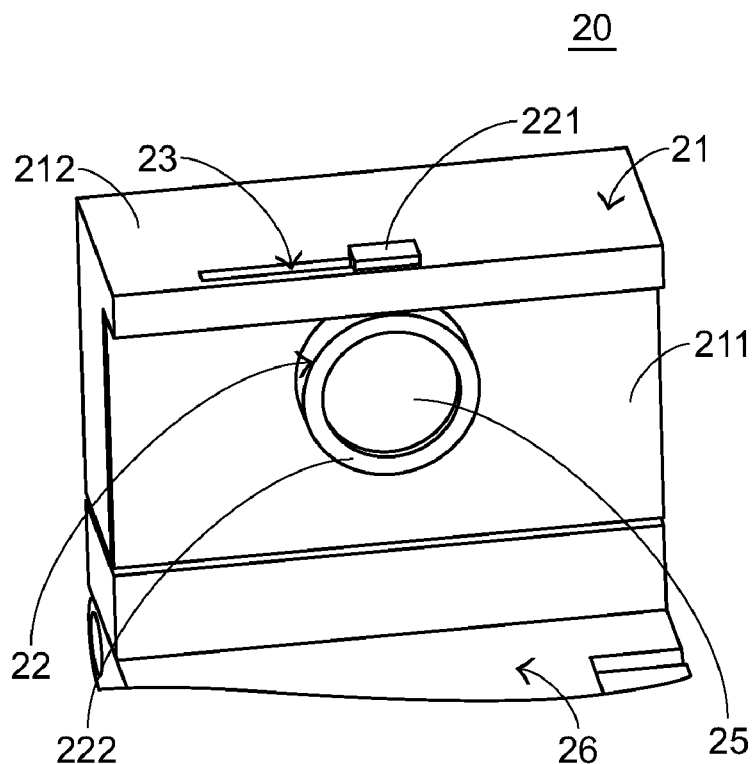
FIGS. 3 and 4 are schematic perspective views illustrating operations of the lens assembly switching mechanism of a portable camera according to a second preferred embodiment of the present invention.
Figure 4:
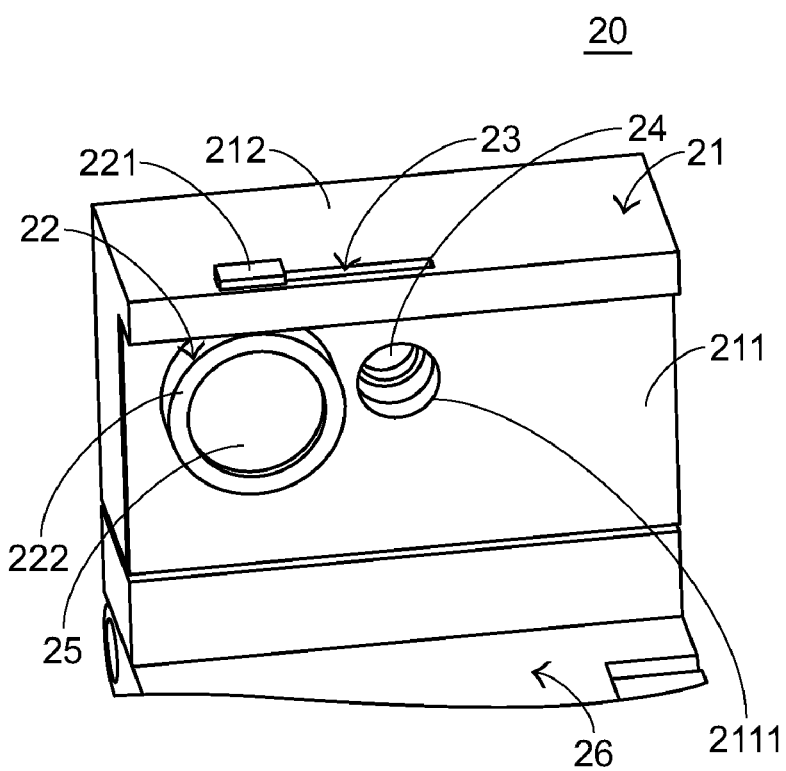

FIGS. 3 and 4 are schematic perspective views illustrating operations of the lens assembly switching mechanism of a portable camera according to a second preferred embodiment of the present invention. In this embodiment, the portable camera 20 is a web camera. The portable camera 20 comprises a camera main body 21, a camera module including a lens assembly 24, a slab module 22 and a coupling structure 23. The camera main body 21 has an upright surface 211 and a top surface 212. The configurations and the working principles of the camera main body 21, the camera module and the coupling structure 23 included in FIGS. 3 and 4 are identical to those shown in FIGS. 1A and 1B, and are not redundantly described herein. In this embodiment, the slab module 22 comprises a T-shaped hook 121 and a single hollow receiving part 222. In addition, a camera opening 2111 is formed in the upright surface 211 of the camera main body 21 for exposing the lens assembly 24 of the portable camera 20.

Since the slab module 22 comprises only the single hollow receiving part 222, the transverse bracket 122 shown in FIGS. 1A and 1B may be omitted. That is, the bottom surface of the vertical slice of the T-shaped hook 221 is directly connected to the single hollow receiving part 222. In addition, a lens assembly 25 is embedded within the single hollow receiving part 222. The shooting angles of the lens assemblies 25 and 24 are distinguishable.

Similarly, the portable camera 20 further comprises a base 26 and an extendable mechanism (not shown). The base 26 is disposed under the camera main body 21. The extendable mechanism is pivotally coupled to the base 26. By means of the extendable mechanism, the focal length between the selected lens assembly and the object (not shown) is adjustable.

Figure 5A:
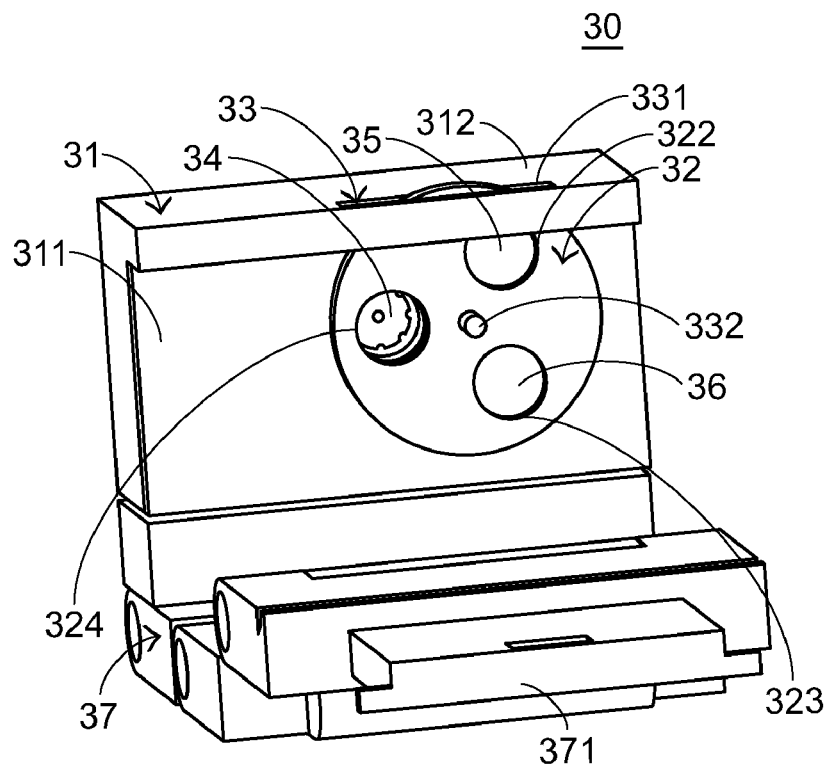
FIG. 5A is a schematic perspective view illustrating a portable camera having a lens assembly switching unit according to a third preferred embodiment of the present invention.
Figure 5B:
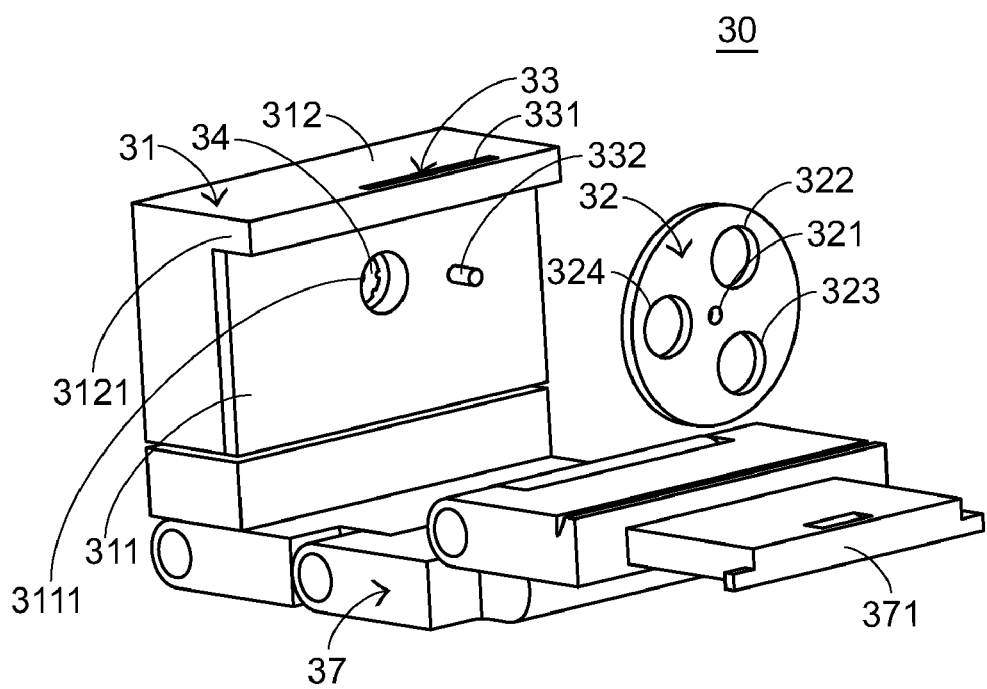
FIG. 5B is a schematic exploded view of the portable camera shown in FIG. 5A.

FIG. 5A is a schematic perspective view illustrating a portable camera having a lens assembly switching unit according to a third preferred embodiment of the present invention. FIG. 5B is a schematic exploded view of the portable camera shown in FIG. 5A. In this embodiment, the portable camera 30 is a web camera. The portable camera 30 comprises a camera main body 21, a camera module including a lens assembly 34, a slab module 32 and a coupling structure 33. Except that the lens assembly 34 is exposed to a camera opening 3111 of the camera main body 31, most components of the camera module are disposed within the camera main body 31. The slab module 32 and a coupling structure 33 are collectively defined as a lens assembly switching mechanism.

The camera main body 31 has an upright surface 311 and a top surface 312. The top surface 312 is disposed adjacent and perpendicular to the upright surface 311. The camera opening 3111 is formed in the upright surface 311 for exposing the lens assembly 34 of the portable camera 30. In addition, a bulge edge 3121 is horizontally extended from the top surface 312 such that the bulge edge 1121 is perpendicular to the upright surface 311. In this embodiment, the coupling structure 33 includes an elongated slit 331 and a post 332. The elongated slit 331 is disposed in the bulge edge 1121. The post 332 is disposed on the upright surface 311 and in the vicinity of the camera opening 3111.

In this embodiment, the slab module 32 is substantially a circular slab having a pivotal hole 321 in the center. The pivotal hole 321 is sheathed around the post 332. In addition, an upper periphery of the circular slab 32 is partially penetrated through the elongated slit 331, so that the upper periphery of the circular slab 32 can be rotated by the user.

Furthermore, the circular slab 32 has at least one hollow receiving part. In this embodiment, the circular slab 32 has three hollow receiving parts 322, 323 and 324. Two lens assemblies 35 and 323 are respectively embedded within the hollow receiving parts 322 and 323. No additional lens assembly is embedded within the hollow receiving part 324 such that the lens assembly 34 is exposed to the camera opening 3111 and the hollow receiving part 324 if the hollow receiving part 324 is aligned with the camera opening 3111. Since the lens assemblies 34, 35 and 36 have different shooting angles, a desired lens assembly is selected according to the user's requirements.

By rotating the circular slab 32 while the circular slab 32 is parallel with the upright surface 311 of the camera main body 31, the hollow receiving part 322, 323 or 324 is aligned with the camera opening 3111. As a consequence, the lens assembly 35, 36 or 34 is selected to provide a desired shooting range.

Similarly, the portable camera 30 further comprises a base 37 and an extendable mechanism 371. The base 37 is disposed under the camera main body 31. The extendable mechanism is pivotally coupled to the base 37. By means of the extendable mechanism, the focal length between the selected lens assembly and the object (not shown) is adjustable.

From the above description, the lens assembly switching mechanism of the present invention is collectively defined by the slab module and the coupling structure. By means of the lens assembly switching mechanism, a lens assembly having a desired shooting angle is selected in order to achieve better shooting performance.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable camera having a lens assembly switching mechanism, said portable camera comprising:
   a camera main body having a camera opening formed in a first surface thereof;
   a camera module disposed within said camera main body and comprising a lens assembly exposed through said camera opening;
   a slab module for carrying one or more selective lens assemblies with different shooting angles; and
   a coupling structure disposed adjacent said first surface of said camera main body and said camera module, wherein said slab module is movable with respect to said coupling structure while said slab module is parallel with said first surface of said camera main body, so that one of said selective lens assemblies is aligned with said camera opening for providing an adjustable shooting angle,
   wherein said portable camera is a web camera, and said web camera further comprises a base and an extendable mechanism, wherein said base is disposed under said camera main body, and said extendable mechanism is pivotally coupled to said base.

2. The portable camera according to claim 1 wherein said first surface of the camera main body is an upright surface at a front side of said camera main body, and said coupling structure comprises an elongated slit formed in a second surface of said camera main body.

3. The portable camera according to claim 2 wherein said second surface of said camera main body is a top surface of said camera main body that is adjacent to said upright surface, a bulge edge is horizontally extended from said top surface, and said elongated slit is disposed in said bulge edge.

4. The portable camera according to claim 3 wherein said slab module comprises a T-shaped hook including a vertical slice and a horizontal slice, wherein said horizontal slice is connected to a top surface of said vertical slice and movably supported on said top surface of the bulge edge, and said vertical slice of said T-shaped hook is received in said elongated slit.

5. The portable camera according to claim 4 wherein said slab module further comprises:
   a transverse bracket having a middle portion connected to a bottom surface of said vertical slice of said T-shaped hook; and
   two hollow receiving parts respectively connected to bottom surfaces of two lateral portions of said transverse bracket such that two selective lens assemblies are respectively embedded within said two hollow receiving parts, wherein said T-shaped hook, said transverse bracket and said two hollow receiving parts are integrally formed as said slab module.

6. The portable camera according to claim 4 wherein said slab module further comprises a single hollow receiving part connected to a bottom surface of said vertical slice of said T-shaped hook such that a selective lens assembly is embedded within said single hollow receiving part, wherein said T-shaped hook and said single hollow receiving part are integrally formed as said slab module.

7. The portable camera according to claim 3 wherein said coupling structure further comprises a post, which is disposed on said upright surface and in the vicinity of said camera opening.

8. The portable camera according to claim 7 wherein said slab module is a circular slab having a pivotal hole sheathed around said post, and an upper periphery of the circular slab is partially penetrated through said elongated slit, so that said upper periphery of said circular slab is rotatable by a user.

9. The portable camera according to claim 8 wherein said circular slab further comprises one or more hollow receiving parts, and said one or more selective lens assemblies are embedded within said hollow receiving parts.

10. A portable camera comprising:
    a camera main body having a camera opening formed in a first surface thereof;
    a camera module disposed within said camera main body and comprising a lens assembly exposed through said camera opening; and
    a lens assembly switching mechanism disposed in front of said first side of said camera main body, and comprising at least two selective lens assemblies with different shooting angles, wherein said slab module is movably coupled to said camera main body while said slab module is parallel with said first surface of said camera main body, so that one of said selective lens assemblies is aligned with said camera opening for providing an adjustable shooting angle, wherein said portable camera is a web camera, and said web camera further comprises a base and an extendable mechanism, wherein said base is disposed under said camera main body, and said extendable mechanism is pivotally coupled to said base.

11. The portable camera according to claim 10 wherein said lens assembly switching mechanism comprising:
   a slab module for carrying said at least two selective lens assemblies; and
   a coupling structure disposed adjacent said first surface of said camera main body and said camera module, wherein said slab module is movable with respect to said coupling structure while said slab module is parallel with said first surface of said camera main body.

12. The portable camera according to claim 11 wherein said first surface of the camera main body is an upright surface at a front side of said camera main body, and said coupling structure comprises an elongated slit formed in a second surface of said camera main body.

13. The portable camera according to claim 12 wherein said second surface of said camera main body is a top surface of said camera main body that is adjacent to said upright surface, a bulge edge is horizontally extended from said top surface, and said elongated slit is disposed in said bulge edge.

14. The portable camera according to claim 13 wherein said slab module comprises a T-shaped hook including a vertical slice and a horizontal slice, wherein said horizontal slice is connected to a top surface of said vertical slice and movably supported on said top surface of the bulge edge, and said vertical slice of said T-shaped hook is received in said elongated slit.

15. The portable camera according to claim 14 wherein said slab module further comprises:
   a transverse bracket having a middle portion connected to a bottom surface of said vertical slice of said T-shaped hook; and
   two hollow receiving parts respectively connected to bottom surfaces of two lateral portions of said transverse bracket such that two selective lens assemblies are respectively embedded within said two hollow receiving parts, wherein said T-shaped hook, said transverse bracket and said two hollow receiving parts are integrally formed as said slab module.

16. The portable camera according to claim 14 wherein said slab module further comprises a single hollow receiving part connected to a bottom surface of said vertical slice of said T-shaped hook such that a selective lens assembly is embedded within said single hollow receiving part, wherein said T-shaped hook and said single hollow receiving part are integrally formed as said slab module.

17. The portable camera according to claim 13 wherein said coupling structure further comprises a post, which is disposed on said upright surface and in the vicinity of said camera opening.

18. The portable camera according to claim 17 wherein said slab module is a circular slab having a pivotal hole sheathed around said post, wherein an upper periphery of the circular slab is partially penetrated through said elongated slit such that said upper periphery of said circular slab is rotatable by a user, and said circular slab further comprises one or more hollow receiving parts such that said one or more selective lens assemblies are embedded within said hollow receiving parts.

\* \* \* \* \*